United States Patent
Parfondry et al.

(10) Patent No.: US 10,611,196 B2
(45) Date of Patent: Apr. 7, 2020

(54) TIRE, THE INNER WALL OF WHICH HAS A LAYER OF SPECIFIC POLYURETHANE FOAM

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Alain Parfondry, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 560 days.

(21) Appl. No.: 14/406,385

(22) PCT Filed: May 30, 2013

(86) PCT No.: PCT/EP2013/061171
§ 371 (c)(1),
(2) Date: Dec. 8, 2014

(87) PCT Pub. No.: WO2013/182477
PCT Pub. Date: Dec. 12, 2013

(65) Prior Publication Data
US 2015/0151592 A1    Jun. 4, 2015

(30) Foreign Application Priority Data
Jun. 8, 2012   (FR) ...................................... 12 55395

(51) Int. Cl.
*B60C 1/00*   (2006.01)
*B60C 19/00*  (2006.01)
(Continued)

(52) U.S. Cl.
CPC ........ *B60C 19/002* (2013.01); *B29D 30/0061* (2013.01); *B29D 30/0681* (2013.01);
(Continued)

(58) Field of Classification Search
CPC ..... B60C 5/002; B60C 17/065; B60C 19/002; B60C 1/00
(Continued)

(56) References Cited

U.S. PATENT DOCUMENTS 4,230,168 A * 10/1980 Kaneda .................. B29D 30/04
                                                            152/310
4,418,093 A    11/1983 Gomberg et al. ................. 427/8
(Continued)

FOREIGN PATENT DOCUMENTS

CN        1396936 A      2/2003
CN      101607451 A    12/2009
(Continued)

OTHER PUBLICATIONS

A.N. Gent, et al., "Permeability of Open-cell Foamed Materials", J. Cellular Plastics, 46-51 (1966).

*Primary Examiner* — Seyed Masoud Malekzadeh
(74) *Attorney, Agent, or Firm* — Venable LLP (57) ABSTRACT

The inner wall of a pneumatic tyre, in the vulcanized state, is provided with a layer of polyurethane foam, characterized in that the polyurethane is based on a diphenylmethane diisocyanate (MDI), in particular 4,4'-diphenylmethane diisocyanate, and on a polyol having an ethylene oxide content of greater than 50% (% by weight). This specific polyurethane formulation makes it possible to obtain a light foam that efficiently absorbs noise; it has the advantages of being simple and inexpensive and of being easy to process by direct casting of the reactants in the pneumatic tyre of the invention.

17 Claims, 3 Drawing Sheets

(51) Int. Cl.
*C08G 18/48* (2006.01)
*B29D 30/06* (2006.01)
*B60C 5/00* (2006.01)
*B29D 30/00* (2006.01)
*C08G 18/32* (2006.01)
*C08G 18/76* (2006.01)
*C08G 101/00* (2006.01)

(52) U.S. Cl.
CPC ............... *B60C 1/00* (2013.01); *B60C 5/002* (2013.01); *C08G 18/3206* (2013.01); *C08G 18/4833* (2013.01); *C08G 18/4841* (2013.01); *C08G 18/7671* (2013.01); *C08G 2101/0008* (2013.01); *C08G 2380/00* (2013.01); *Y10T 152/10495* (2015.01)

(58) Field of Classification Search
USPC ........................................ 152/155, 157, 450
See application file for complete search history.

(56) References Cited

U.S. PATENT DOCUMENTS

| | | | | |
|---|---|---|---|---|
| 6,506,813 B1* | 1/2003 | Parfondry | ............. | C08G 18/10 |
| | | | | 252/182.25 |
| 6,508,898 B1* | 1/2003 | Rustad | ................. | B29C 73/163 |
| | | | | 152/502 |
| 6,579,912 B2 | 6/2003 | Parfondry et al. | ............ | 521/174 |
| 6,590,008 B1* | 7/2003 | Parfondry | .......... | C08G 18/4072 |
| | | | | 252/182.25 |
| 7,182,114 B2* | 2/2007 | Yukawa | ................ | B60C 19/002 |
| | | | | 152/450 |
| 7,975,740 B2* | 7/2011 | Yukawa | ................ | B60C 19/002 |
| | | | | 152/375 |
| 8,220,515 B2 | 7/2012 | Aoki et al. | ..................... | 156/450 |
| 2003/0060528 A1* | 3/2003 | Parfondry | .......... | C08G 18/4837 |
| | | | | 521/155 |
| 2003/0105177 A1* | 6/2003 | Parfondry | .......... | C08G 18/4804 |
| | | | | 521/155 |
| 2003/0158281 A1* | 8/2003 | Parfondry | .......... | C08G 18/4837 |
| | | | | 521/155 |
| 2007/0175559 A1 | 8/2007 | Tanno et al. | ................... | 152/450 |
| 2009/0053492 A1* | 2/2009 | Tanno | ................... | B60C 19/002 |
| | | | | 428/218 |
| 2009/0308523 A1* | 12/2009 | Kuramori | ............. | B29D 30/00 |
| | | | | 156/123 |
| 2010/0012243 A1* | 1/2010 | Tanno | ................... | B60C 19/002 |
| | | | | 152/155 |
| 2010/0038005 A1* | 2/2010 | Aoki | ..................... | B60C 19/002 |
| | | | | 152/450 |
| 2011/0308677 A1* | 12/2011 | Kamprath | ............ | B60C 19/002 |
| | | | | 152/155 |
| 2012/0136085 A1* | 5/2012 | Choi | ................. | C08G 18/1875 |
| | | | | 521/172 |
| 2015/0094387 A1 | 4/2015 | Wiltz, Jr. et al. | ............. | 521/128 |

FOREIGN PATENT DOCUMENTS

| | | |
|---|---|---|
| EP | 1 529 665 A1 | 5/2005 |
| EP | 1950057 A1 | 7/2008 |
| EP | 2067634 A1 | 6/2009 |
| EP | 2457748 A1 | 5/2012 |
| WO | 2006/117944 A1 | 11/2006 |
| WO | 2007/058311 A1 | 5/2007 |
| WO | 2008/062673 A1 | 5/2008 |
| WO | 2010/000789 A1 | 1/2010 |
| WO | 2013/023125 A1 | 2/2013 |

\* cited by examiner

TIRE, THE INNER WALL OF WHICH HAS A LAYER OF SPECIFIC POLYURETHANE FOAM

1. FIELD OF THE INVENTION

The invention relates to pneumatic tyres for motor vehicles and also to polymer foams that can be used for the manufacture of such tyres.

It relates more particularly to the pneumatic tyres having an inner wall or inflation cavity that is airtight (or impermeable to another inflation gas) and which is provided with a layer of polyurethane foam intended for reducing the noise emitted by these tyres when the vehicles are running.

2. PRIOR ART

It is known that the noise emitted by a pneumatic tyre when rolling originates in particular from the vibrations of its structure following contact of the tyre with the uneven roadway, also giving rise to a generation of various sound waves. This is all ultimately manifested in the form of noise, both inside and outside the vehicle. The amplitude of these various manifestations is dependent on the modes of vibration characteristic of the pneumatic tyre but also on the nature of the surface on which the vehicle is moving. The range of frequencies corresponding to the noise generated by the pneumatic tyres typically extends from 20 to 4000 Hz approximately.

As regards the noise emitted outside the vehicle, the various interactions between the pneumatic tyre and the road surface, and the pneumatic tyre and the air are relevant, which will give rise to a disturbance for local residents when the vehicle is running along a roadway. In this case several sources of noise are also distinguished such as the noise referred to as "indentation noise" due to the impact of the roughnesses of the road in the contact area, the noise referred to as "friction noise" essentially generated at the end of the contact area, the noise referred to as "tread pattern noise" due to the arrangement of the tread pattern elements and to the resonance in the various grooves. The range of frequencies in question here typically corresponds to a range extending from 300 to 3000 Hz approximately.

As regards the noise detected inside the vehicle, two modes of sound propagation coexist:
- the vibrations are transmitted by the wheel centre, the suspension system and the transmission ultimately generating noise in the passenger compartment; this is then referred to as solid-borne transmission, which is generally dominant for the low frequencies of the spectrum (up to approximately 400 Hz);
- the sound waves emitted by the pneumatic tyre are directly propagated by an airborne route inside the vehicle, the latter serving as a filter; this is then referred to as airborne transmission, which generally dominates in the high frequencies (approximately 600 Hz and above).

The noise referred to as "road noise" refers rather to the overall level detected in the vehicle and in a frequency range extending up to 2000 Hz.

Finally, a large part of the noise detected inside the vehicle is introduced by the "cavity noise" which refers to the disturbance due to the resonance of the inflation cavity of the pneumatic tyre, this noise dominating in a specific frequency range from approximately 190 to 230 Hz.

In order to reduce the rolling noise of a pneumatic tyre, in particular the cavity noise, it is known to provide its inner wall with a layer of polyurethane CPU) foam, as described for example in the patents or patent applications WO 2006/117944 or U.S. Pat. No. 7,975,740, WO 2007/058311 or US 2009/0053492, US 2007/0175559, WO 2008/062673 or US 2010/0038005, US 2009/0053492, WO 2010/000789 or US 2011/0308677, EP 1 529 665 or U.S. Pat. No. 7,182,114.

Experimentation shows however that the technical solutions used, either do not make it possible to obtain polyurethane foams that are both light and efficiently absorb the noise, or are relatively complex to process and therefore expensive.

3. BRIEF DESCRIPTION OF THE INVENTION

The Applicants have discovered, during their research, a specific polyurethane formulation that makes it possible to obtain a light foam that efficiently absorbs the noise. It has the advantage of being simple and inexpensive, it is additionally easy to process in the pneumatic tyre of the invention.

Consequently, the present invention relates to a pneumatic tyre, in the vulcanized state, the inner wall of which is provided with a layer of polyurethane foam, characterized in that the polyurethane is based on a diphenylmethane diisocyanate (abbreviated to MDI) and on a polyol having an ethylene oxide content of greater than 50% (% by weight).

The pneumatic tyres of the invention are particularly intended to be fitted on motor vehicles of the passenger type, including 4×4 (four-wheel drive) vehicles and SUV vehicles ("Sport Utility Vehicles"), and also industrial vehicles such as vans and heavy vehicles (for example underground trains, buses, heavy road transport vehicles).

4. BRIEF DESCRIPTION OF THE DRAWINGS

The invention and its advantages will be readily understood in light of the description and exemplary embodiments that follow, and also FIGS. 1 to 3.

5. DETAILED DESCRIPTION OF THE INVENTION

In the present description, unless expressly indicated otherwise, all the percentages (%) indicated are percentages by weight.

Moreover, any interval of values denoted by the expression "between a and b" represents the range of values extending from more than "a" to less than "b" (i.e. limits a and b excluded) whereas any interval of values denoted by the expression "from a to b" means the range of values extending from "a" to "b" (i.e. including the strict limits a and b).

The pneumatic tyre of the invention therefore has the essential feature that the inner wall thereof is provided, completely or partly covered, with at least one layer of polyurethane (abbreviated to PU) polymer foam, capable of reducing the cavity noise, said PU being based on diphenylmethane diisocyanate (abbreviated to MDI) and on a polyol having an ethylene oxide content of greater than 50% by weight; these compounds are described in detail hereinbelow.

It will be recalled here briefly that a PU, generally, is the reaction product of a polyisocyanate (compound bearing at least two —NCO isocyanate functions) and of a polyol (compound bearing at least two —ROH alcohol functions), the alcohol functions of the polyol used generally being attached either to polyethers, or to polyesters.

The PU foam of the tyre of the invention therefore has the distinctive feature of being based on a specific diisocyanate compound, in this case an MDI, which is combined with a polyol that is itself specific, in this case a polyether having a high content of ethylene oxide (greater than 50%).

According to one preferred embodiment, the MDI is the only diisocyanate or, if several diisocyanate compounds are present, forms the predominant diisocyanate by weight, preferably representing in the latter case more than 50% of the total weight of the diisocyanate compounds. If several diisocyanate compounds are present, the MDI more preferably still represents more than 70%, in particular more than 90% by weight of all of the diisocyanate compounds. As an example of another diisocyanate that can be used as a blend with the MDI, mention will for example be made of TDI (toluene diisocyanate, customarily used as a mixture of 2,4- and 2,6-isomers).

However, according to one particularly preferred embodiment, the MDI, in particular 4,4'-MDI, is the only diisocyanate forming the PU foam of the pneumatic tyre of the invention.

All isomers of MDI (especially 2,2'-MDI, 2,4'-MDI, 4,4'-MDI) and mixtures thereof, and also polymeric MDIs that comprise, in addition to MDI, oligomers of formula below (with n greater than or equal to 1):

or mixtures of said aforementioned MDIs and polymeric MDIs can be used. The compounds of carbodiimide/uretonimine, allophanate, urethane, urea or oxazolidone type, obtained by partial reaction of MDI with itself or with hydroxyl, amine or epoxide compounds are also included.

More preferably, the MDI used is 4,4'-MDI (4,4'-diphenylmethane diisocyanate), as a reminder of formula:

or, if several MDIs (diphenylmethane diisocyanates) are used, forms the predominant MDI by weight, preferably representing in the latter case more than 50% of the total weight of the MDI compounds; more preferably still, if several MDIs are present, 4,4'-MDI represents more than 70%, in particular more than 90% by weight of all of the MDI compounds.

According to another preferred embodiment, the polyol having a high ethylene oxide content (greater than 50%, preferably greater than 70%, more preferably still greater than 90%), is the only polyol forming the PU foam of the tyre of the invention, or, if several polyols are present, forms the predominant polyol by weight, especially in the second case for more than 50% by weight of all of the polyols used.

If several polyols are present, the polyol having a high ethylene oxide content preferably represents more than 70%, more preferably more than 90% by weight of all of the polyols. As examples of other polyols that can be used as a blend with the polyol having a high ethylene oxide content, mention will for example be made of polyethers such as polyether polyols based on propylene oxide or on butylene oxide, or on other epoxide monomers, polyester polyols, polycarbonates, polyoxytetramethylene glycols or polyols of hybrid structure based on several of the aforementioned monomers.

However, according to one particularly preferred embodiment, the polyol having a high ethylene oxide content (greater than 50%, preferably greater than 70%, more preferably still greater than 90%) is the only polyol forming the PU foam.

Preferably, the polyol having a high ethylene oxide content is a polyol randomly polymerized with ethylene oxide and propylene oxide, with more preferably between 50% and 90% by weight of ethylene oxide and from 10% to 50% of propylene oxide; more preferably still, the ethylene oxide content represents from 70% to 85%, in particular from 75% to 80% by weight of such a polyol.

Such preferred polyols or polyethers are well known and are commercially available, for example from the company BASF under the trade name "Lupranol 2048", from the company Dow under the trade name "Voranol CP1421", or else from the company Bayer under the trade name "Desmophen 41WB01".

According to another preferred embodiment, the diisocyanate/polyol molar ratio is between 2 and 10, preferably between 3 and 6, in particular between 4 and 5.

The two base constituents (MDI and polyol) described above may be completely mixed and pre-reacted before foaming; it is then referred to as a prepolymer process. In the case of a pre-mixing (partial pre-reaction), it is then referred to as a semi- or quasi-prepolymer process.

The prepolymer route is preferred since it makes it possible in particular to simplify the formulation of the foam which is intrinsically more stable and easier to distribute in the cavity of the pneumatic tyre, to obtain faster foaming times since only the foaming reaction must be controlled, to facilitate adhesion to the support, since the foam applied in the liquid phase adheres better to the inner liner of the tyre, without making it necessary in particular to use an additional adhesive. It finally makes it possible to better adapt the formulation of the foam to the desired performances.

Of course, more conventionally, the two base constituents (MDI and polyol) may also only be brought into contact with one another at the last moment, during foaming. The polyol could be premixed with the foaming agent and the other customary additives.

The manufacture of the PU foam is carried out in a manner known to a person skilled in the art by reaction of the MDI/polyol mixture (and other additives) in the presence of a blowing agent or foaming agent, or a precursor of a foaming agent. An expansion obtained via a chemical route is preferred, in particular obtained via reaction of water and isocyanate with consecutive formation of $CO_2$ gas as foaming agent.

The initial composition of the PU foam may also comprise other additives customary for this type of application, such as for example precursors of foaming agents other than water (for example a gas such as $CO_2$ directly), chain extenders, crosslinking agents, fillers, for example of mineral type such as silica, talc, chalk, calcium or barium salts, having a thixotropic effect, stabilizers, for example of alkanolamine type, aromatic primary amines, low molecular weight triols such as glycerol, aliphatic primary amines, catalysts such as tertiary amines, surfactants, antioxidants, rheology modifiers, viscosity regulators or thickeners (see for example application WO 2013/023125) such as polyethylene oxides or high molecular weight cellulose ethers, dyes or pigments.

The PU foam may be prepared beforehand (which is rather the general case) then cut to the desired dimensions, for example in the form of bands or narrow strips, and lastly bonded to the inside of the (vulcanized) tyre by any suitable means, for example using an adhesive composition or a double-sided adhesive tape, in a manner that is well known per se.

According to another advantageous preferred embodiment, the PU foam may be manufactured in situ, directly in the (vulcanized) pneumatic tyre by simultaneous casting of the reactants (for example prepolymer and water) in the cavity of the rotating tyre, according to processes whose general principles have for example been described in patent documents U.S. Pat. No. 4,418,093 or 6,508,898.

Thus, the reactive liquid based on MDI and polyol expands immediately in contact with the water to give a foam that solidifies rapidly on the inner surface of the pneumatic tyre.

Such a process is particularly advantageous and economical since it makes it possible to install the PU foam in a single step, at rapid speed, without requiring all the prior operations of preparing the foam, cutting to the desired dimensions then bonding the foam to the inside of the tyre.

The physical properties of the PU foam, especially its acoustic properties, may be adjusted by the specific formulation used and the amount of foam applied. Great freedom in terms of shapes is possible without prohibitive cost since the reactive liquid can be deposited following a predefined design.

According to one preferred embodiment of the invention, the PU foam, the formulation of which has been described above, of flexible foam type, has at least one of the characteristics below:

- a density, expressed by the apparent core density measured according to the ISO 845 standard, which is between 0.020 and 0.070 g/cm$^3$, more preferably in a range from 0.030 to 0.060 g/cm$^3$;
- a compressive strength, expressed by the stress/strain characteristic in compression measured according to the ISO 3386-1 standard, at 50% volume compression, which is between 2 and 11 kPa, preferably in a range from 2 to 5 kPa;
- a compression set, measured according to the ISO 1856 standard (method A) at 90% compression and at a temperature of 70° C., which is less than 25%, preferably less than 15%;
- an air flow resistivity of greater than 10 000 Pa·s·m$^{-2}$, more preferably greater than 20 000 Pa·s·m$^{-2}$, measured according to the ISO 4638 standard.

The above ISO 4638 standard is used in the following manner: the base model (described in "*Permeability of open cell foamed materials*", A N Gent & K C Rusch, J. of Cellular Plastics, 46-51, 1966) uses the equation:

$$\Delta P/(e \cdot U) = (\eta/K) + \rho(U/B)$$

in which "e" represents the thickness (in meters) of the foam sample tested, U the air flow in m$^3$/s, $\eta$ represents the viscosity of the air (i.e. 1.85×10$^{-5}$ Pa·s at 20° C.), K represents the air permeability in m$^2$, $\rho$ represents the density of the air (i.e. 1.2 kg/m$^3$ at 20° C.), and B represents the inertial flow coefficient of air.

The air flow resistivity is represented by the ratio ($\eta$/K) expressed in Pa·s·m$^{-2}$ (or Rayl/m). The principle is to measure U through a foam sample of given thickness "e" while establishing various levels of pressure drop ($\Delta P$). The curve $\Delta P/(e.U) = f(U)$ is then plotted on a graph, the slope of which is $\rho$/B and the ordinate at the origin is $\eta$/K.

More preferably still, this PU foam of the tyre of the invention has in combination all of the above properties, in particular all of the most preferred properties stated above.

In the pneumatic tyre of the invention, the thickness of the foam layer is between 5 and 100 mm, preferably between 10 and 50 mm, in particular between 20 and 40 mm.

It has been observed, advantageously, that the PU foam according to the invention, the specific formulation of which has been described above in detail, also possesses excellent adhesive properties with respect to rubber compositions forming the inner wall of the pneumatic tyres, and also with respect to products of wash type intended to facilitate the demoulding of these tyres after curing, during their final separation from the curing membrane.

5. EXEMPLARY EMBODIMENTS OF THE INVENTION

5.1. Examples of Tyres in Accordance with the Invention

The polymer foam composition described previously can advantageously be used in the pneumatic tyres of all types of vehicles, in particular passenger vehicle tyres.

Figure 1:
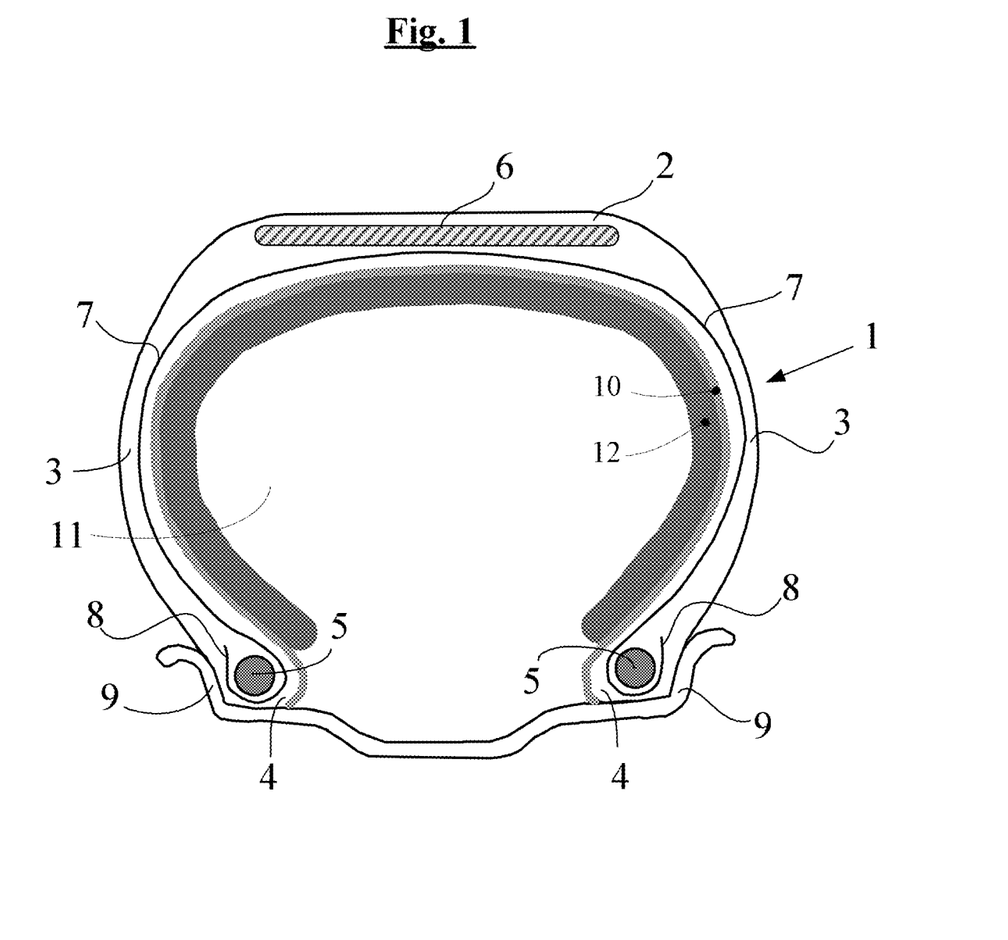
FIG. 1 schematically shows, in radial cross-section, an example of a pneumatic tyre in accordance with the invention, vulcanized, the inner wall of which is provided with a layer of PU foam that covers substantially all of the inner wall of the tyre.
Figure 2:
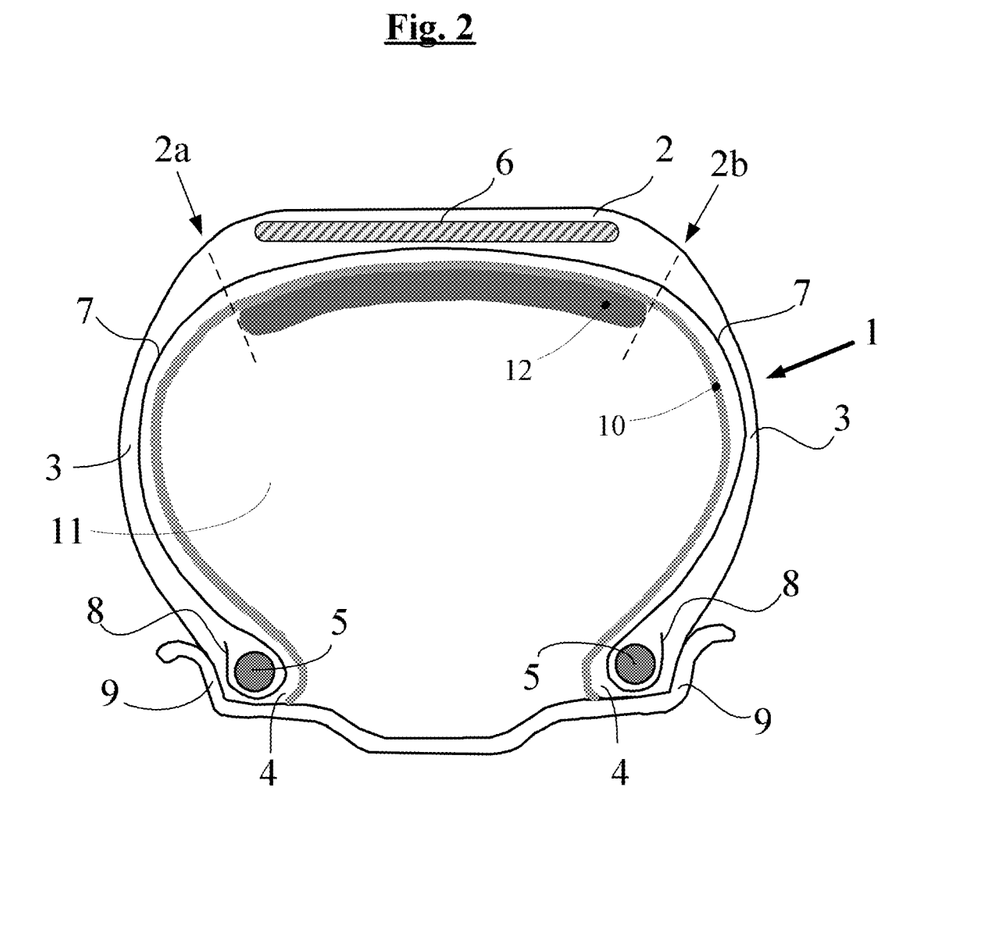
FIG. 2 schematically shows, in radial cross-section, an example of a tyre in accordance with the invention, vulcanized, the inner wall of which is provided with a layer of PU foam that extends only under the crown substantially from one shoulder to the other.
Figure 3:
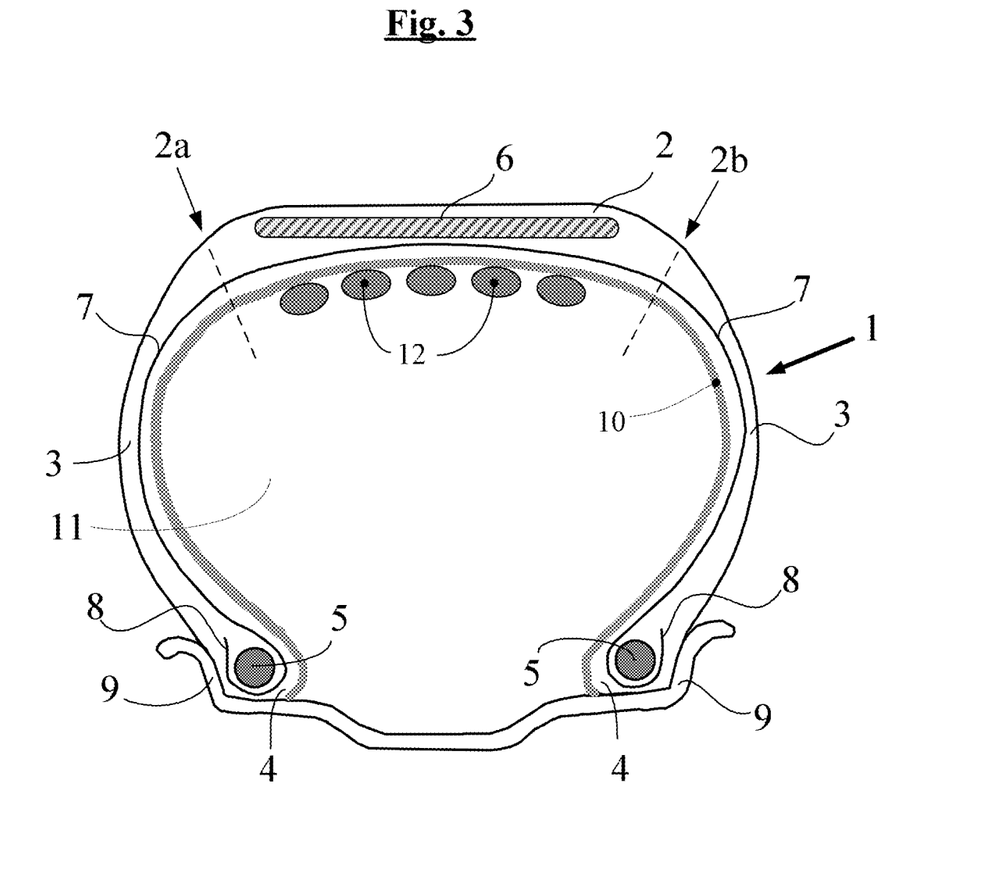
FIG. 3 schematically shows, in radial cross-section, another example of a tyre in accordance with the invention, vulcanized, the inner wall of which is provided with a strip of PU foam which is coiled helically under the crown in several coils, along an angle close to zero with respect to the circumferential direction.

By way of example, appended FIGS. 1 to 3 very schematically (in particular not to a specific scale) represent examples of radial cross sections of motor vehicle pneumatic tyres having a radial carcass reinforcement, in accordance with the invention, these tyres being in the uncured (i.e. unvulcanized) state.

These pneumatic tyres 1 comprise a crown region 2 reinforced by a crown reinforcement or belt 6, two sidewalls 3 and two inextensible beads 4, each of these beads 4 being reinforced with a bead wire 5. The crown region 2, delimited laterally by two shoulders (2a, 2b) is surmounted by a tread (not shown in this schematic figure, for simplification), the belt 6 consisting, for example, of at least two superposed crossed plies reinforced by metal cords. A carcass reinforcement 7 is wound around two bead wires 5 in each bead 4, the upturn 8 of this reinforcement 7 being for example positioned towards the outside of the pneumatic tyres, which here are shown fitted onto their rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the axis of rotation of the pneumatic tyre, which lies halfway between the two beads 4 and passes through the middle of the crown reinforcement 6).

These pneumatic tyres 1 also comprise, in a well-known manner, an inner rubber layer 10 (commonly referred to as "inner liner") that defines the radially inner face of the pneumatic tyre, in contact with the inflation cavity 11. This airtight layer 10 enables the tyre 1 to be inflated and kept pressurized. Its airtightness properties enable it to guarantee a relatively low rate of pressure loss, enabling the pneumatic tyre to be kept inflated, in a normal operating state, for a sufficient duration, normally for several weeks or several months.

These pneumatic tyres in accordance with the invention are characterized in that their inner wall 10 is at least partly covered, on the side of the cavity 11, with a PU foam layer 12 capable of partly absorbing the cavity noise.

In accordance with a first possible embodiment of the invention, said inner wall (10) comprises, on its radially inner face, a PU foam layer (12) that extends substantially over the entire inner wall of the pneumatic tyre, extending from one sidewall to the other, practically up to the rim flange when the pneumatic tyre 1 is in the fitted position, as illustrated for example in FIG. 1.

According to another possible embodiment of the invention, the layer (12) could cover, still on its radially inner face, one part only of the airtight layer (10), in this case preferably in the crown region of the tyre, as illustrated for example in FIG. 2.

In the examples of tyres represented in FIGS. 1 and 2 above, the PU foam has for example been prepared beforehand, then cut to the desired dimensions, and lastly bonded to the inside of the vulcanized pneumatic tyre, according to conventional techniques well known to a person skilled in the art.

According to another preferred embodiment, the PU foam is manufactured in situ by direct casting of the reactants inside the cavity 11 of the rotating pneumatic tyre, onto its airtight layer 10.

In such a case, once the in situ manufacturing operation is finished, the inner wall 10 appears, under the crown 2, provided with one or more helical windings 12 (for example 3 to 5 windings), juxtaposed or not, of a continuous strip of PU foam, of generally cylindrical shape and having a relatively large diameter, these windings, when there are several, may be oriented along a small angle with respect to the circumferential direction of the pneumatic tyre, as illustrated for example in FIG. 3, so as to be able to wind the same continuous strip several times. In such a configuration, by convention, the thickness of the PU foam layer is understood as the mean diameter (or at the very least its maximum thickness in the radial direction if its cross section is not circular), of the PU foam strip.

Of course, other embodiments are possible, the casting technique described above making it possible to envisage shapes, lengths and designs of PU foam strips that may vary widely depending on the particular applications targeted.

In the examples from the appended figures, the layer 10 (for example having a thickness equal to around 1.0 mm) is for example based on butyl rubber, it has a standard formulation for an inner liner. The PU foam layer 12 itself consists of a polyurethane composition as described above based on MDI and polyol having a high ethylene oxide content; its thickness is for example between 20 and 40 mm.

Thus positioned between the airtight layer 10 and the cavity 11 of the pneumatic tyre, the PU foam layer makes it possible to substantially reduce, as demonstrated in the following examples, the rolling noise detected inside the vehicle.

5.2. Tests

In the following tests, a PU foam according to the invention was prepared as follows, from 2 components denoted here by A and B.

4,4'-MDI ("Suprasec 1306" from the company Huntsman, 16 400 g) was melted at 50° C. and poured into a 100 litre reactor with a blade agitator; this reactor comprised an external recirculation circuit inserted in which was a static mixer preceded by a branch connection enabling the subsequent addition of the polyol. In a second container, the polyol ("Lupranol 2048" from the company BASF, 38 780 g) was firstly heated at 70° C. Next, the latter was slowly poured above the static mixer onto the MDI in the liquid state, in the presence of 100 ppm of benzoyl chloride (acidity regulator), over a period of 1 hour, while the temperature of the mixture was maintained at 85° C., and while the MDI was subjected to a permanent recirculation by passing into the static mixer.

The prepolymer mixture (component A) thus obtained was a colourless liquid having (measurements carried out 24 h later) a percentage of —NCO bonds of 7.8% (% by weight, measured according to the EN 1242 standard) and a viscosity of 6500 mPa·s at 25° C.

Next, the prepolymer (component A) thus prepared was transferred into the tank of a two-component (A and B) polyurethane micro-casting machine of low pressure type (Dosamix, from the company Secmer), heated at 50° C.

The component B had the following formulation, expressed in parts by weight per hundred parts of prepolymer A:
  water: 1.93 parts;
  triethanolamine: 0.15 parts;
  diazabicyclo[2,2,2]octane: 0.15 parts.

One variant of manufacture of the component B above may consist in adding a portion of the polyol (for example, in the above test, around 3 parts of "Lupranol 2048") to facilitate processing.

Finally, the component B, also heated at 50° C., was mixed with the component A in a smooth stator gear conical mixing head, according to the following foaming conditions:
  A/B weight ratio: 100/2.45 (i.e. respectively 5.69 g/s and 0.14 g/s); this ratio corresponds in a known manner to a (stoichiometric) "NCO index" of 85;
  respective pressures: 4 bar (for A and for B).

The foaming liquid thus obtained was cast in situ in the cavity of "MICHELIN" brand ("Primacy HP") pneumatic tyres, of 255/45 R18 dimensions, kept in rotation (30 rpm) about their horizontal axis, in the form of a substantially cylindrical continuous strip (diameter of around 30 mm) wound 3 times underneath the crown (as illustrated very schematically in FIG. 3) along an angle of between 1.5 and 2.0 degrees with respect to the circumferential direction of the tyre.

The foam thus produced in situ, besides excellent adhesion to the inner liner of the (wash coated) tyre, had the following properties:
  an apparent core density, according to ISO 845, equal to around 45 g/dm$^3$;

a stress/strain characteristic in compression, according to ISO 3386-1, at 50% volume compression, equal to around 4.1 kPa;

a compression set, according to ISO 1856 (method A) at 90% compression and at a temperature of 70° C., equal to around 20%;

an air flow resistivity, according to ISO 4638, equal to around 120 000 Pa·s·m$^{-2}$.

During additional tests, the present test was repeated while adding, to component B, around 3% (% by weight relative to the amount of water) of polyethylene oxide ("Polyox" WSR N-750 from the company Dow, having a molecular weight equal to around 300 000), in order to increase the viscosity thereof.

The pneumatic tyres in accordance with the invention thus prepared, provided with their PU foam layer, were then inflated to 2.5 bar and subjected to a rolling test and sound absorption test as described hereinbelow, and compared to control tyres that were completely identical apart from the absence of PU foam in the cavity of these control tyres.

Next, the performance with respect to cavity noise was evaluated by rolling of the tyres tested on a macro-rough track (bituminous concrete having a particle size of 6 mm, with a macro-texture of 0.4 to 0.5 mm). The noise is recorded inside the vehicle (MERCEDES S-Class) using a mannequin equipped with an acoustic head (microphones placed at the bottom of artificial ears). The speed is stabilized and 4 recordings of 20 s each are carried out at a frequency of 4 kHz. The spectrum (resolution of 1 Hz) of the time signal recorded is calculated and the auto-spectra of each of the two ears and of each of the four recordings are averaged.

The cavity noise is that measured (average) in a frequency range extending from 180 to 230 Hz, characteristic of the resonance of the air cavity contained in the tyre.

At a speed of 60 km/h, it was observed that this cavity noise was reduced by 2.5 dB(A) with respect to the control tyres. This result is expressed as sound energy (dB(A)) which corresponds to the integration of the sound pressure as a function of the frequency over the frequency range in question.

Such a difference is very significant for a person skilled in the art. The result obtained was even proven to be slightly better (−0.5 dB(A)), it is this which was observed during additional comparative tests, than those observed in the case of commercial PU foams, conventionally precut then bonded in the cavity of control pneumatic tyres.

Thus, by virtue of the proposed invention, it has proved possible to notably reduce the cavity noise due to the rolling of the tyres, without adversely affecting their other rolling performances, in addition with minimal impact on their production cost.

The specific polyurethane formulation according to the invention makes it possible to obtain a light foam that efficiently absorbs the noise, which has the advantage of being simple and inexpensive, of being very easy to process making direct casting of the reactants in a rotating pneumatic tyre possible.

Finally, comparative tests were carried out on other PU foam formulations, which clearly demonstrated that:

with a polyol having less than 50% of ethylene oxide ("Lupranol L2090" from BASF), the excessively open foam did not have sufficient cohesion, tending to collapse during the very manufacture of the pneumatic tyre according to the preferred (in situ) casting process described above;

the replacement of MDI by another diisocyanate compound, in this case TDI ("Scuranate T80" from the company Perstorp; 80% by weight of 2,4-isomer), the formulation otherwise being identical, resulted in foams that were too compact and closed, having very high densities (greater than 200 kg/m$^3$), which did not make it possible to attenuate the noise effectively.

The invention claimed is:

1. A pneumatic tire, in a vulcanized state, an inner wall of which is provided with a layer of polyurethane foam,
wherein the polyurethane foam is based on a diphenylmethane diisocyanate and on a randomly polymerized polyol having an ethylene oxide content of greater than 50% by weight of the polyol and a propylene oxide content from 10% to 50% by weight of the polyol, and
wherein a molar ratio of diphenylmethane diisocyanate/randomly polymerized polyol is between 2 and 10.

2. The pneumatic tire according to claim 1, wherein the diphenylmethane diisocyanate is the only diisocyanate compound present.

3. The pneumatic tire according to claim 1, wherein the diphenylmethane diisocyanate is 4,4'-diphenylmethane diisocyanate.

4. The pneumatic tire according to claim 1, wherein the randomly polymerized polyol having an ethylene oxide content of greater than 50% by weight of the polyol is the only polyol present.

5. The pneumatic tire according to claim 1, wherein the ethylene oxide content of the polyol is greater than 70%.

6. The pneumatic tire according to claim 1, wherein the molar ratio of diphenylmethane diisocyanate/randomly polymerized polyol is between 3 and 6.

7. The pneumatic tire according to claim 1, wherein the polyurethane foam has an apparent core density, measured according to the ISO 845 standard, between 0.020 and 0.070 g/cm$^3$.

8. The pneumatic tire according to claim 7, wherein the polyurethane foam has an apparent core density, measured according to the ISO 845 standard, in a range from 0.030 to 0.060 g/cm$^3$.

9. The pneumatic tire according to claim 1, wherein the polyurethane foam has a stress/strain characteristic in compression, measured according to the ISO 3386-1 standard at 50% volume compression, between 2 and 11 kPa.

10. The pneumatic tire according to claim 1, wherein the polyurethane foam has a compression set, measured according to the ISO 1856 standard method A at 90% compression and at a temperature of 70° C., less than 25%.

11. The pneumatic tire according to claim 9, wherein the polyurethane foam has a compression set, measured according to the ISO 1856 standard method A at 90% compression and at a temperature of 70° C., less than 15%.

12. The pneumatic tire according to claim 1, wherein the polyurethane foam has an air flow resistivity, measured according to the ISO 4638 standard, greater than 10 000 Pa·s·m$^{-2}$.

13. The pneumatic tire according to claim 12, wherein the polyurethane foam has an air flow resistivity, measured according to the ISO 4638 standard, greater than 20 000 Pa·s·m$^{-2}$.

14. The pneumatic tire according to claim 1, wherein a thickness of the layer of polyurethane foam is between 5 and 100 mm.

15. The pneumatic tire according to claim 14, wherein the thickness of the layer of polyurethane foam is between 10 and 50 mm.

16. The pneumatic tire according to claim 1 further comprising another diisocyanate compound, wherein the diphenylmethane diisocyanate represents more than 50% of the total weight of diisocyanate compounds present.

17. The pneumatic tire according to claim 1 further comprising another polyol, wherein the randomly polymerized polyol, having an ethylene oxide content of greater than 50% by weight of the polyol and a propylene oxide content from 10% to 50% by weight of the polyol, represents more than 50% of the total weight of polyols.

* * * * *